US005757508A

United States Patent [19]

Murata

[11] Patent Number: 5,757,508

[45] Date of Patent: May 26, 1998

[54] CHARGING MEMBER HAVING AN ELASTOMERIC MEMBER COMPRISING AN ELASTOMERIC MATERIAL AND A DOUBLE OXIDE

[75] Inventor: Jun Murata, Kawagoe, Japan

[73] Assignee: Canon Kabushiki Kaisha, Tokyo, Japan

[21] Appl. No.: 208,038

[22] Filed: Mar. 9, 1994

Related U.S. Application Data

[63] Continuation of Ser. No. 492,583, Mar. 13, 1990, abandoned.

[30] Foreign Application Priority Data

Mar. 14, 1989 [JP] Japan ........................ 1-61336

[51] Int. Cl.[6] ........................ H04N 1/23; H04N 1/29; G03G 21/00; H05B 3/00

[52] U.S. Cl. ........................ 358/296; 358/300; 219/216; 399/168

[58] Field of Search ........................ 358/296, 300; 355/219, 277; 29/132; 118/640, 644, 651, 653; 399/168, 176, 50; 219/216; 427/380, 383.5, 385.5, 38, 387, 393.5, 58, 126.1, 126.3, 145, 331, 359, 360; 428/423.1, 425.9, 446, 450, 451, 457, 458, 469, 492, 689, 694 R, 931

[56] References Cited

U.S. PATENT DOCUMENTS

| | | | |
|---|---|---|---|
| 3,521,126 | 7/1970 | Granzow et al. | 317/3 |
| 3,717,462 | 2/1973 | Negishi et al. | 96/1.5 |
| 3,920,330 | 11/1975 | Wells et al. | 355/3 |
| 4,179,601 | 12/1979 | Tarumi et al. | 219/216 |
| 4,360,262 | 11/1982 | Genthe | 355/3 |
| 4,505,573 | 3/1985 | Brewington et al. | 29/132 X |
| 4,657,835 | 4/1987 | Yashiki | 430/60 |
| 4,754,300 | 6/1988 | Fukae | 358/300 X |
| 4,827,868 | 5/1989 | Tarumi et al. | 29/132 X |
| 4,919,776 | 4/1990 | Kishimoto et al. | 204/157.4 |
| 4,959,731 | 9/1990 | Fukae | 355/202 X |
| 4,984,326 | 1/1991 | Horie et al. | 355/299 X |
| 5,034,777 | 7/1991 | Ohzeki et al. | 355/274 |
| 5,079,117 | 1/1992 | Koyama et al. | 358/300 X |
| 5,140,371 | 8/1992 | Ishihara et al. | 399/176 |
| 5,144,368 | 9/1992 | Ohzeki et al. | 355/219 |
| 5,378,526 | 1/1995 | Murata | 358/300 X |
| 5,475,473 | 12/1995 | Masuda et al. | 399/168 |
| 5,567,494 | 10/1996 | Ageishi et al. | 219/216 |

FOREIGN PATENT DOCUMENTS

| | | | |
|---|---|---|---|
| 0272072 | 6/1988 | European Pat. Off. . | |
| 0404079 | 12/1990 | European Pat. Off. . | |
| 59-224871 | 12/1984 | Japan . | |
| 62-41171 | 9/1987 | Japan | C01G 9/00 |
| 63-156858 | 6/1988 | Japan . | |
| 63-170673 | 7/1988 | Japan . | |

*Primary Examiner*—Eric Frahm

*Attorney, Agent, or Firm*—Fitzpatrick, Cella, Harper & Scinto

[57] ABSTRACT

A charging member including an elastomeric member including an elastomeric material. The elastomeric material includes a polymer dispersion medium having a double oxide dispersed therein, the double oxide being a solid solution compound of oxides of at least two different metals formed by crystal lattice substitution. The at least two different metals have different valences, whereby the double oxide has an electroconductivity that is larger than that of either one of the oxides of at least two different metals when not in solution. Also, the charging member has resistance stability in the semiconductive region.

25 Claims, 3 Drawing Sheets

CHARGING MEMBER HAVING AN ELASTOMERIC MEMBER COMPRISING AN ELASTOMERIC MATERIAL AND A DOUBLE OXIDE

This application is a continuation of prior application Ser. No. 07/492,583 filed on Mar. 13, 1990, now abandoned.

FIELD OF THE INVENTION AND RELATED ART

The present invention relates to a charging member, particularly to a charging member for electrophotography to be used for transferring, charging for a photosensitive member, conveying, paper-feeding, etc.; and to an electrophotographic apparatus using such a charging member.

Hitherto, charging members for electrophotography have frequently posed some problems with respect to their electric resistance.

For example, electrophotographic printers such as compact laser-beam printers which have recently been used widely mostly use an organic photoconductor (hereinafter, referred to as "OPC") as a photosensitive member and use a reversal development system wherein an image-exposed portion of the photosensitive member is developed.

Further, as the transfer device constituting this type of printer, a contact-type roller transfer device or belt transfer device is used, since it has various advantages such that it may miniaturize the device, can conduct a transfer operation under the application of a low voltage, and produces only a small amount of corona discharge products such as ozone, and has good stability for conveying a transfer material (or transfer-receiving material) such as paper.

In such a contact-type transfer device, in order to transfer well a toner image from an image-bearing member to a transfer material having an extremely high resistance such as paper which has been left standing under low-humidity conditions, and a sheet for a transparency comprising a polyester film, it is necessary to use a strong electric field for transfer.

When such a strong electric field is directly applied to the image-bearing member, an excessive current is passed therethrough, whereby the image-bearing member is damaged. Such a phenomenon becomes marked when a paper of a small size is passed through the transfer device. In order to solve these problems, it is necessary for a transfer charging member to have its resistivity in a semiconductive region.

Similarly, in a case where a contact-type charging device uses an electroconductive charging member for primary charging of a photosensitive member, there are posed known problems such that the life of the photosensitive member is shortened because of a strong electric current passing therethrough; and when a pin-hole is present on the photosensitive member, it causes a discharge phenomenon, resulting in an image defect. Accordingly, in order to solve the above-mentioned problem, the primary charging member is intended to have an electric resistance (or resistivity) in the semiconducting region, thereby to limit the electric current flowing into the photosensitive member, in the same manner as in the case of the above-mentioned transfer charging member.

As the conventional method for obtaining a material having a resistivity in the semiconductive region, in the prior art, an electroconductive filler such as electroconductive carbon, graphite or metal powder, has been dispersed in an elastomeric or elastic material such as rubber or resin matrix, thereby to regulate the resistivity. However, as known in the prior art, the resistivity is abruptly changed in the semiconductive region depending on the amount of the electroconductive filler displaced in the matrix, and therefore the filler loss due to the scattering of the electroconductive filler to the outside which can occur at the time of mixing of the filler, or a slight difference in the degree of dispersion is liable to appear as a change in the electric resistivity. Accordingly, such a method is poor in reproducibility, and has a problem with respect to stability in mass production.

Further, there has been proposed a method wherein a plasticizer, a low-molecular weight liquid rubber, or a surfactant is added to the material constituting a charging member, whereby the resistivity may be stabilized in the semiconductive region. However, when such an additive is used, the plasticizer, low-molecular weight liquid rubber, or surfactant is liable to exude to the surface of the charging member, and then migrates to a photosensitive member disposed in contact therewith to contaminate the photosensitive member; As a result, there is posed a problem that image failure is caused by such contamination. Further, when the plasticizer, low-molecular weight liquid rubber, or surfactant exudes to the surface of the charging member, the adhesiveness of the charging member is remarkably increased, whereby the charging member adsorbs toner particles and paper dust and its function deteriorates.

Further, Japanese Laid-Open Patent Application (JP-A, KOKAI) No. 156858/1988 discloses a dispersion comprising a silicone rubber and a pulverized product of crosslinked silicone rubber containing carbon black. In such a case, however, there is posed a problem such that the production cost becomes high.

SUMMARY OF THE INVENTION

An object of the present invention is, in view of the above-mentioned problems, to provide a charging member which is stable in a semiconductive region, is excellent in mass-productivity, and is capable of reducing the production cost.

Another object of the present invention is to provide an electrophotographic apparatus which is capable of providing copied images of good quality, even after successive copying of a large number of sheets.

According to the present invention, there is provided a charging member comprising an elastomeric member comprising an elastomeric material and a double oxide contained therein.

The present invention also provides an electrophotographic apparatus comprising an electrophotographic photosensitive member and a charging member disposed in contact with the surface of the photosensitive member, wherein the charging member comprises an elastomeric member comprising an elastomeric material and a double oxide contained therein.

The present invention further provides a facsimile comprising an electrophotographic apparatus and receiving means for receiving image information from a remote terminal; the electrophotographic apparatus comprising an electrophotographic photosensitive member and a charging member disposed in contact with the surface of the photosensitive member, wherein the charging member comprises an elastomeric member comprising an elastomeric material and a double oxide contained therein.

The charging member according to the present invention comprising an elastomeric (or elastic) material and a double oxide contained therein is capable of being reproducibly produced, and is stable in the semiconductive region wherein the conventional charging member is not stable. Further, when a reinforcing agent and/or softener (or softening agent) is added to the elastomeric material, a desired resistivity in the semiconductive region may stably be obtained, and further a reinforcing property and/or a softness may be imparted to the elastomeric material. In a case where such an agent is used in the charging member, it may provide a sufficient nip width in combination with a photosensitive member disposed in contact with the charging member, whereby a good charging characteristic is obtained.

These and other objects, features and advantages of the present invention will become more apparent upon a consideration of the following description of the preferred embodiments of the present invention taken in conjunction with the accompanying drawings.

DETAILED DESCRIPTION OF THE PREFERRED EMBODIMENTS

Figures 1A, 1B:
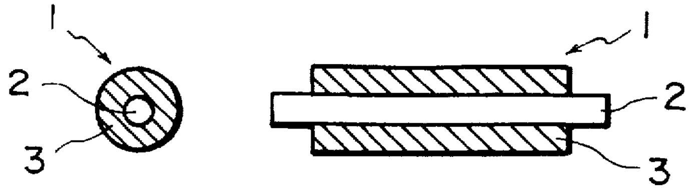
FIGS. 1A and 1B are schematic sectional views showing cross sections of an embodiment of the charging member according to the present invention in lateral and longitudinal directions with respect to the axis direction of the charging member, respectively.

The double oxide used in the present invention refers to a compound of higher order (i.e., a compound formed by an intermolecular bond) comprising at least two species of oxides, i.e., a metal oxide wherein at least two species of metals are co-present. The double oxide may be produced, e.g., by dispersing one or more kind of different species of metal ions in a crystal lattice of another metal oxide, and baking or calcining the resultant product in a reducing atmosphere. For example, a double oxide comprising zinc oxide and aluminum oxide is prepared by treating zinc oxide and an aluminum salt in an aqueous ammonium salt solution, dehydrating the resultant product and then baking it in an atmosphere of hydrogen, as described in Japanese Patent Publication (JP-B, Kokoku) No. 41171/1987.

Accordingly, the above-mentioned double oxide is different from a simple metal oxide. Specific examples of such a double oxide may include: solid solution compounds comprising zinc oxide (ZnO) and aluminum oxide ($Al_2O_3$); solid solution compounds comprising tin oxide ($SnO_2$) and antimony oxide ($Sb_2O_5$); solid solution compounds comprising indium oxide ($In_2O_3$) and tin oxide ($SnO_2$); solid solution compounds comprising zinc oxide (ZnO) and titanium oxide ($Ti_2O_3$); solid solution compounds comprising magnesium oxide (MgO) and aluminum oxide ($Al_2O_3$); solid solution compounds comprising iron oxide (FeO) and titanium oxide ($TiO_2$); etc.

Such a double oxide may be characterized in that the respective metals contained therein have similar atomic radii and constitute a substitutional solid solution, and their valences are different, whereby the double oxide provides an electroconductivity which cannot be provided by either metal oxide alone.

The above-mentioned double oxide may preferably have a specific resistance (or resistivity) of $10^1$ ohm.cm to $10^3$ ohm.cm, which is higher than that of electroconductive carbon black, reinforcing carbon black, ruthenium oxide, etc. (i.e., $10^{-2}$ ohm.cm to $10^0$ ohm.cm), and is lower than that of zinc oxide, aluminum oxide, antimony oxide, indium oxide, tri-iron tetroxide, tin oxide, etc. (i.e., $10^4$ ohm.cm or higher).

When the filler comprising a double oxide according to the present invention which has a specific resistance of $10^1$ to $10^3$ ohm.cm is used, a stable semiconducting property is provided by using an addition amount which causes substantially no problem in physical properties, whereby the resultant semiconducting material is excellent in reproducibility and stability in mass-production.

On the other hand, in the case of the conventional filler to be dispersed in a dispersion medium such as polymer, when the filler has a specific resistance of below $10^1$ ohm.cm, the amount thereof dispersed in the polymer provides a region wherein the resistance is abruptly changed, whereby the resultant dispersion is poor in reproducibility and stability in mass-production, as described hereinabove.

Further, in a case where the conventional filler has a specific resistance above $10^3$ ohm.cm, a considerably large amount thereof is required in order to obtain a semiconducting property, whereby the dispersing operation becomes difficult. Even if such a large amount of the filler is dispersed in a dispersion medium, the physical property of the resultant dispersion becomes poor and cannot reach a practically acceptable level. In such a case, the hardness of the resultant dispersion becomes considerably high so that it cannot provide a sufficient and stable contact state in combination with a photosensitive member, etc.

Among the above-mentioned double oxides, $ZnO.Al_2O_3$ is particularly preferred for certain reasons, including that: the filler comprising such a double oxide may provide a specific resistance of $10^2$ to $10^3$ ohm.cm which is nearest to an ideal value in view of resistance stability in the semiconductive region; it may easily be dispersed in a polymer dispersion medium such as resin and rubber, and the resultant dispersion is excellent in moldability; it may be produced at a low cost; an appropriate resistance value may obtained by changing the doping amount of Al (or $Al_2O_3$); etc.

The double oxide content in an elastomeric composition may preferably be 5–40 wt. %, more preferably 10–30 wt. %, based on the total weight of the elastomeric composition (inclusive of the double oxide per se).

In an embodiment wherein the charging member also has a function of conveying a transfer material such as paper, as in the case of a roller-type (or roller-form) charging member for transfer, the material per se constituting the charging member is required to have a mechanical strength such as wear resistance. In such a case, a reinforcing agent may preferably be used in combination with the above-mentioned double oxide.

As the reinforcing agent, reinforcing carbon such as carbon black, silica, etc., may appropriately be used. In the case of carbon black, according to my investigation, it has been found that an excellent reinforcing property and a stable resistance may be obtained at a specific resistance of $10^0$ ohm.cm or higher of the carbon black, and an addition amount of 0.1–20 wt. %, more preferably 1–15 wt. % based on the total weight of the composition (inclusive of the reinforcing agent per se). When the specific resistance is lower than $10^0$ ohm.cm, the conducting ability is too great, and unevenness in potential is liable to occur even with a small amount of the carbon black present. When the amount exceeds 20 wt. %, the resistance of the resultant dispersion is liable to depend on the carbon black rather than the double oxide, whereby the addition of the double oxide becomes less meaningful.

In the present invention, the carbon black may be selected from those usable for general industry. Specific examples thereof may include those referred to as: ISAF (Intermediate Super Abrasion Furnace), SAF (Super Abrasion Furnace), HAF (High-Abrasion Furnace Black), FEF (Fast Extrusion Furnace), SRF (Semi-Reinforcing Furnace), FT (Fine Thermal), EPC (Easy Processing Channel), MPC (Medium Processing Channel), etc.

In the case of a roller-type charging member for transfer or in the case of primary charging, the charging member may provide good charging or transfer characteristic free of unevenness, when the charging member retains a sufficient contact area with a photosensitive member under pressure. Accordingly, when the charging member is used for such a purpose, it should preferably have a particularly low hardness.

In such a case, a process oil such as insulating oil may preferably be used. As a result of my investigation of various insulating oils, it has been found that a low hardness, an excellent reinforcing property and a stable resistance may be obtained at a specific resistance thereof of $10^{12}$ ohm.cm or higher, and an addition amount of 5–20 wt. %, more preferably 8–16 wt. %, based on the total weight of the composition (inclusive of the oil per se). In a case where an insulating oil having a specific resistance of below $10^{12}$ ohm.cm is used, when the oil migrates to a photosensitive member, the potential on the photosensitive member is changed only in the portion to which the oil has migrated, thereby impairing the resultant copied image or inviting toner agglomeration on the photosensitive member. When the addition amount exceeds 20 wt. %, the exudation of the oil to the charging member surface becomes marked to contaminating the photosensitive member, and the attachment of toner particles and paper dust also becomes marked, whereby the function of the charging member is liable to be deteriorated.

Preferred examples of such an insulating oil may include paraffin oils and mineral oils.

Specific examples of the elastomeric (or elastic) material used in the present invention may include: rubbers such as EPDM (ethylene-propylene-diene terpolymer), polybutadiene, natural rubbers, polyisoprene, SBR (styrene-butadiene rubber), CR (chloroprene rubber), NBR (nitrile-butadiene rubber), silicone rubber, urethane rubber, and epichlorohydrin rubber; thermoplastic elastomers including RB (butadiene rubber), polystyrene-type such as SBS (styrene-butadiene-styrene elastomer), polyolefine-type, polyester-type, polyurethane-type and polyvinyl chloride; and polymer materials such as polyurethane, polystyrene, polyethylene, polypropylene, polyvinyl chloride, acrylic resins, styrene-vinyl acetate copolymers, and butadiene-acrylonitrile copolymers.

The elastomeric material may be used in the form of either a foam (or foamed material) or a solid rubber.

Further, another filler may be added to the elastomeric material as desired. Specific examples thereof may include: calcium carbonate, various clays, talc, or blends of these; and silica-type fillers such as hydrous silicic acid, anhydrous silicic acid, and salts of these.

In the present invention, a foaming agent (or blowing agent) may be used. Specific examples thereof may include: ADCA (azodicarbonamide), DPT (di-nitroso-pentamethylenetetramine), OBSH (4,4'-oxybis (benzenesulfonylhydrazide), TSH (p-toluenesulfonylhydrazide), AIBN (azobisisobutyronitrile), etc. When a blend of ADCA and OBSH is used, a foam of tight vulcanization (i.e., foam having a high degree of crosslinking) may be obtained.

In the case of a polymer such as certain types of urethane rubber and silicone rubber which is capable of changing the strength or softness of the material by regulating the polymer structure thereof of the polymer per se, it is sufficient to add a double oxide alone to the polymer. When such a polymer is used, hardness and strength requisite for practical use may be attained even without using reinforcing filler such as carbon black or softener.

In the present invention, the specific resistance of powder such as double oxide may be measured at a load of 100 $kg/cm^2$ under a condition of 25° C. and 60% RH according to a general method of measuring powder resistance. More specifically, the specific resistance may for example be measured in the following manner.

Powder to be measured is sandwiched between two circular plate electrodes, a voltage is applied therebetween, and the magnitude of the current passing between the electrodes is measured. The resistance of the powder may be determined on the basis of the thus measured current magnitude.

The shape or form of the charging member according to the present invention may for example be a roller, a blade, etc., and may appropriately be selected corresponding to the specification and/or form of an electrophotographic apparatus using it.

FIGS. 1A and 1B show a basic structure of a roller-form charging member 1 according to the present invention. In such an embodiment, the charging member 1 comprises a cylindrical electroconductive substrate 2; and an elastomeric (or elastic) layer 3 formed thereon. The elastomeric layer 3 comprises an elastomeric (or elastic) material and a double oxide contained therein. In an embodiment wherein the charging member has a blade form, such a charging member may comprise an electroconductive substrate in the form of a plate, and an elastomeric layer formed thereon containing a double oxide.

The electroconductive substrate 2 may comprise a metal or metal alloy such as iron, copper and stainless steel; or an electroconductive resin, etc.

When a photosensitive member is charged by using the charging member according to the present invention, a voltage may for example be externally applied to the charging member disposed in contact with the photosensitive member, whereby the photosensitive member is charged.

In a system wherein a photosensitive member is charged by means of a charging member disposed in contact therewith, the photosensitive member may be charged by means of the charging member supplied with a voltage presumably because discharge is effected through a slight gap or clearance between the photosensitive member and charging member, i.e., a narrow wedge-like space outside the contact portion between the photosensitive member and charging member. The charging member is caused to contact the photosensitive member in order to provide such a minute clearance. In other words, the above-mentioned minute clearance may be retained by causing the charging member to contact the photosensitive member.

The charging member according to the present invention may be used for transfer, primary charging and discharging (or charge-removing). In addition, the charging member may be used for conveying, e.g., as a paper-feeding roller, etc. In the prior art, there has been encountered a problem that a portion of a transfer material contacting a conveying roller is charged by friction between the conveying roller and the transfer material, and charging unevenness occurs in the transfer material per se, thereby causing unevenness in the resultant image. The above-mentioned material according to the present invention may be used as a means for solving such a problem.

The photosensitive member to be used in combination with the charging member according to the present invention may include various photosensitive members comprising an OPC (organic photoconductor), a-Si, (amorphous silicon), Se, ZnO, etc. Particularly, when the charging member according to the present invention is used in combination with an OPC photosensitive member which is susceptible to deterioration with respect to mechanical strength and chemical stability, the charging member may remarkably exhibit its characteristic.

The charging member according to the present invention may be used for electrophotographic apparatus including ordinary copying machines, and apparatus relating to electrophotography such as laser-beam printers, LED printers and electrophotographic plate-making systems.

Figure 2:
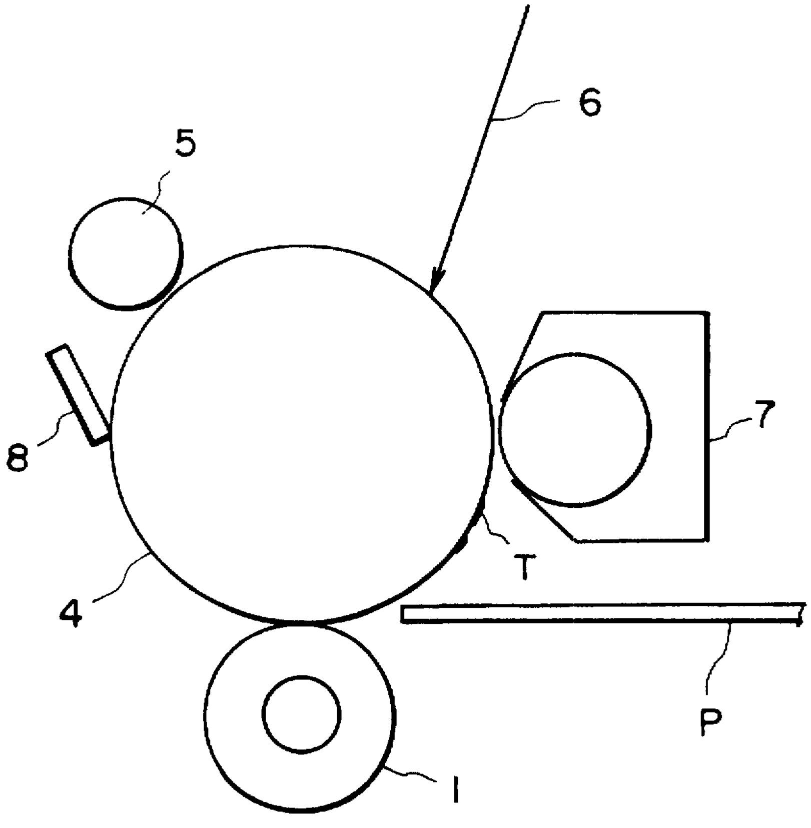
FIG. 2 is a schematic sectional view showing an electrophotographic apparatus used in Examples appearing hereinafter.

FIG. 2 is a schematic sectional view showing an electrophotographic apparatus wherein the charging member according to the present invention is used as a charging member for transfer operation.

Referring to FIG. 2, the electrophotographic apparatus in such an embodiment may comprise: a cylindrical photosensitive member 4, and around the peripheral surface of the photosensitive member 4, a charging roller 5 as a primary charger, an image exposure means (not shown) for providing a laser light beam 6 to form a latent image on the photosensitive member 4, a developing device 7 for developing the latent image with a toner or developer (not shown) to form a toner image T on the photosensitive member 4, a transfer charging roller 1 for transferring the toner image T from the photosensitive member 4 onto a transfer-receiving material (or transfer material) P such as paper, and a cleaner 8 for removing residual toner. In FIG. 2, the above-mentioned charging roller 5, image exposure means for providing the light beam 6, developing device 7, transfer charging roller 1, and cleaner 8 are disposed in this order along the peripheral surface of the photosensitive member 4 with respect to the moving direction of the photosensitive member 4.

In the electrophotographic apparatus as shown in FIG. 2, the photosensitive member 4, which has been sensitized to near infrared rays, is uniformly charged negatively by a contact charging method by means of the charging roller 5, and then raster-scanned by the laser light 6 which has been modulated according to an image signal so as to decrease selectively the potential of an image portion of the photosensitive member 4, whereby an electrostatic latent image is formed on the photosensitive member 4. The thus formed latent image is developed or visualized with a negatively chargeable toner contained in the developing device 7, thereby to form the toner image T on the photosensitive member 4.

Thereafter, the toner image T is transferred from the photosensitive member 4 onto the transfer material P by means of the roller-form transfer charging member 1 to which a positive voltage is applied. The transfer material P to which the toner image T has been transferred is then conveyed to a fixing device (not shown) so that the toner image T is permanently fixed to the transfer material P.

The residual toner which remains on the photosensitive member 4 without transferring to the transfer material P at the time of the transfer operation is removed by means of the cleaner 8. Such an electrophotographic process may be repeated in the same manner as described above.

In the present invention, a plurality of elements or components of an electrophotographic apparatus such as the above-mentioned photosensitive member, developing means and cleaning means may be unitedly assembled into a device unit, and the device unit may be detachably disposed in the apparatus body. For example, a photosensitive member 4 and a cleaner 8 may be unitedly assembled in a device unit, and such a device unit is detachably disposed in the apparatus body by the medium of a guiding means such as rail of the apparatus body. In such an embodiment, a charger and/or a developing means may further be assembled in the above-mentioned device unit.

In a case where an electrophotographic apparatus is used as a copying machine or printer, the above-mentioned image exposure may be conducted by reading an original image per se, or reflection light or transmission light based thereon, and converting the resultant information into a signal; and scanning a laser beam, or driving a light-emitting diode array or a liquid crystal shutter array corresponding to the thus obtained signal.

Figure 3:
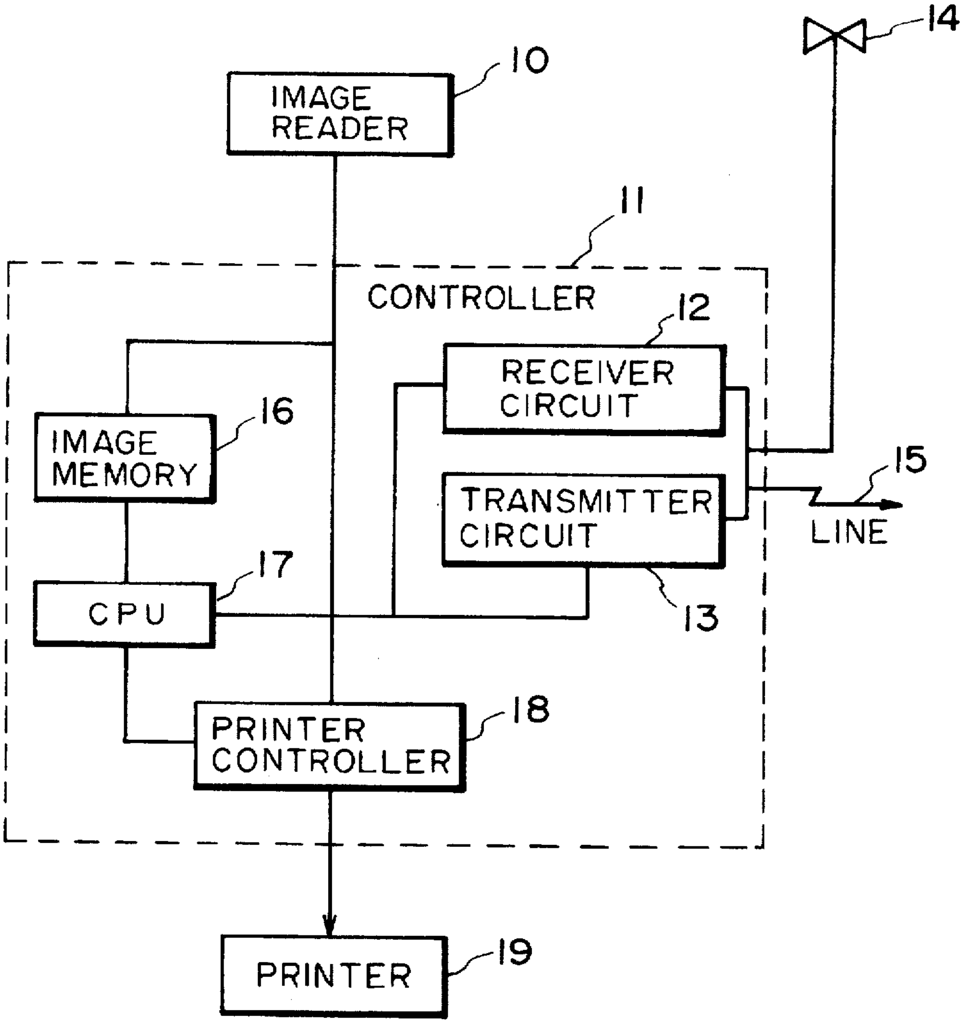
FIG. 3 is a block diagram showing a facsimile machine using the electrophotographic apparatus according to the present invention as a printer.

In a case where an electrophotographic apparatus is used as a printer for facsimile, the above-mentioned image exposure corresponds to that for printing received data. FIG. 3 shows such an embodiment by using a block diagram.

Referring to FIG. 3, a controller 11 controls an image reader (or image reading unit) 10 and a printer 19. The entirety of the controller 11 is regulated by a CPU 17. Read data from the image reader 10 is transmitted through a transmitter circuit 13 to another terminal such as a facsimile machine. On the other hand, data received from another terminal such as facsimile is transmitted through a receiver circuit 12 to a printer 19. An image memory 16 stores prescribed image data. A printer controller 18 controls the printer 19. In FIG. 3, reference numeral 14 denotes a telephone system.

More specifically, an image received from a line (or circuit) 15 (i.e., image information received from a remote terminal connected by the line to the illustrated equipment) is demodulated by means of the receiver circuit 12, decoded by the CPU 17, and sequentially stored in the image memory 16. When image data corresponding to at least one page is stored in the image memory 16, image recording is effected with respect to the corresponding page. The CPU 17 reads image data corresponding to one page from the image memory 16, and transmits the decoded data corresponding to one page to the printer controller 18. When the printer controller 18 receives the image data corresponding to one page from the CPU 17, the printer controller 18 controls the printer 19 so that image data recording corresponding to the page is effected. During the recording by the printer 19, the CPU 17 receives another image data corresponding to the next page.

Thus, receiving and recording of an image may be effected by means of the apparatus shown in FIG. 3 in the above-mentioned manner.

The present invention will be explained in more detail with reference to examples.

EXAMPLE 1

A formulation comprising: 100 wt. parts (hereinafter, simply referred to as "part(s)") of an EPDM (trade name: EPT 4045, mfd. by Mitsui Sekiyu Kagaku) as a polymer dispersion medium, 10 parts of zinc white (Zinc White No. 1, mfd. by Tokyo Kasei), 2 parts of stearic acid, 2 parts of an accelerator "M" (trade name: Nocceler M, mfd. by Ouchi-Shinko Kagaku), 1 part of an accelerator "BZ" (trade name: Nocceler BZ, mfd. by Ouchi-Shinko Kagaku), 2 parts of sulfur, 5 parts of a foaming agent (trade name: Cellmic C, mfd. by Sankyo Kasei), 5 parts of a foaming aid (trade name: Cellton NP, mfd. by Sankyo Kasei); and a reinforcing agent, an insulating oil and another additive as shown in the following Table 1 each in an amount as shown in Table 1 was uniformly dispersed and kneaded by means of a twin-roller device at normal (or room) temperature.

The resultant rubbery kneaded product was wound about a metal core of iron having a diameter of 6 mm and a length of 250 mm, onto which a synthetic rubber-type primer had been applied, and the resultant product was charged into a mold, and preformed at 40° C. and 100 kgf/cm$^2$. The resultant product was vulcanized by steam vulcanization (160° C., 30 min) and then subjected to abrasion machining, whereby five species of roller-form charging members A to E were prepared. The resultant charging member had an outside diameter of 16 mm and the rubber layer thereof had a length of 230 mm.

The resistance of the charging member was measured by disposing the charging member on an aluminum plate, applying a load of 500 g to each end of the charging member (total load: 1 kg), and measuring the resistance between the metal core of the charging member and the aluminum plate under conditions of 23° C. and 50% RH.

TABLE 1

| | | | | | (parts) |
|---|---|---|---|---|---|
| | Copying member | | | | |
| Additive | A | B | C | D | E |
| Reinforcing agent HAF carbon (Asahi #70, mfd. by Asahi Carbon) | | 45 | 50 | 45 | |
| Reinforcing agent FEF carbon (Asahi #60, mfd. by Asahi Carbon) | 20 | | | | 30 |
| Insulating oil Paraffin oil 1 × 10$^{14}$ ohm · cm | 70 | 60 | 65 | 55 | 40 |
| Ketjen Black EC (Lion-Akzo) 0.1 ohm · cm | Variable | | | | |
| $ZnO.Al_2O_3$ (double oxide) (23K-S mfd. by Hakusui Kagaku) 200 ohm · cm | | Variable | Variable | Variable | |
| $Fe_3O_4$ 2 × 10$^5$ ohm · cn | | | | | Variable |

Figure 4:
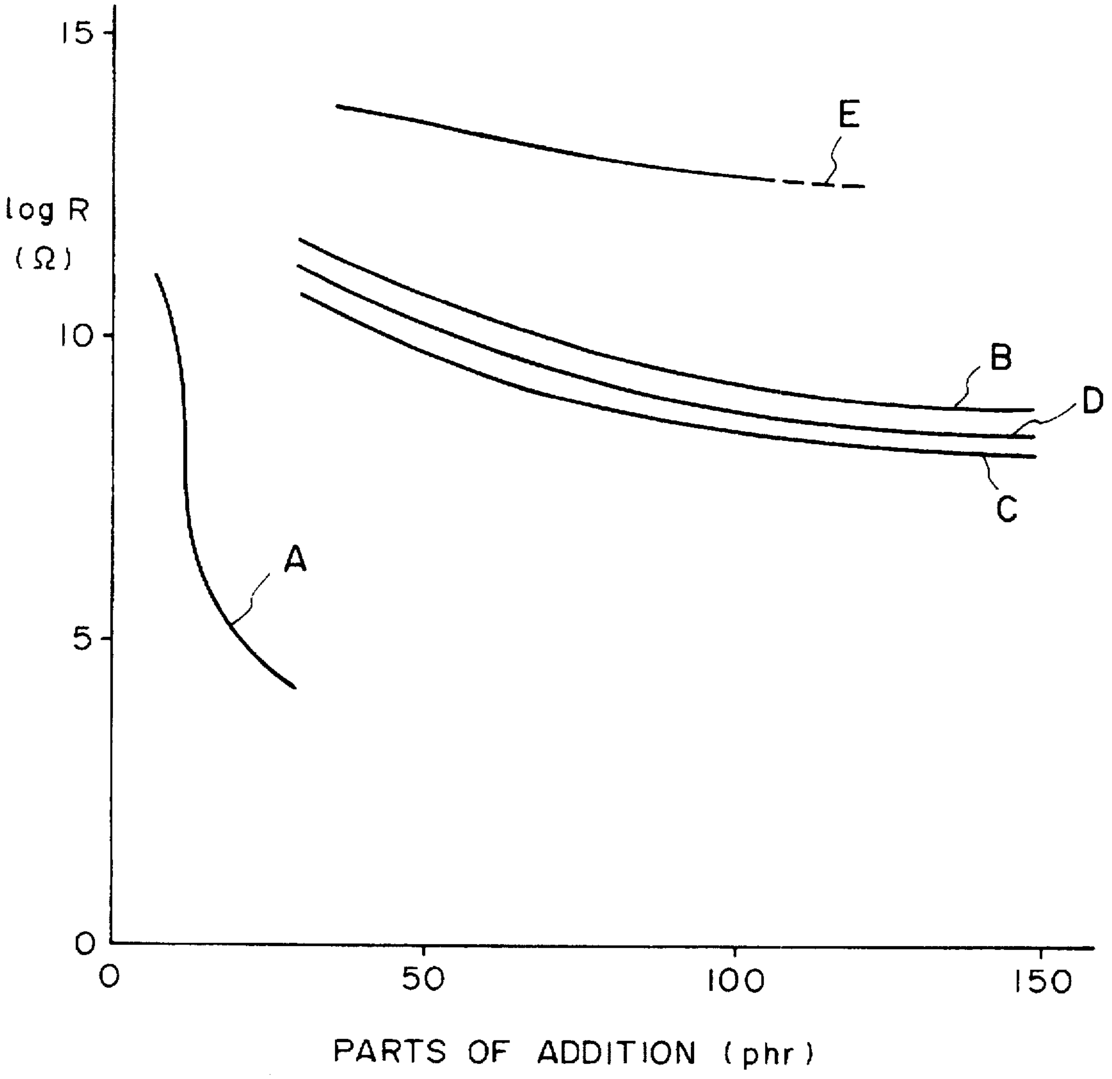
FIG. 4 is a graph showing a relationship between the amount of an additive and the resistance of a charging member.

FIG. 4 is a graph showing a relationship between the thus obtained resistance of each charging member and the addition amount of each filler.

As apparent from FIG. 4, in a predetermined semiconductive region, when a double oxide of $ZnO.Al_2O_3$ was added to the composition, variations in the resistance corresponding to changes in the amount of double oxide were little, and a desired stable resistance value could arbitrarily be obtained.

Further, a stable resistance value could arbitrarily be obtained by changing the ratio between the amount of the reinforcing carbon and that of the insulating oil.

Further, a reproducibility test for the resistance value was conducted with respect to the respective compositions. In case of the electroconductive carbon (Ketjen Black EC), the resistance varied from 5×10$^7$ to 5×10$^{10}$ ohm. (i.e., in a range corresponding to three orders of magnitude), when a resistance of 10$^9$ ohm. was intended by using the carbon in an amount of 12 phr (parts per 100 parts of the total weight of the composition including the additive such as the carbon per se).

On the other hand, in the case of the $ZnO.Al_2O_3$ double oxide, the resistance varied in the range of from (intended value)×1.125 to (intended value)×0.875, i.e., in a range corresponding to ¼ of the intended value. It was found that such variations were substantially within measurement tolerance.

Further, with respect to the charging member E, a resistance value in a desired semiconductive region could not be obtained, even when the amount of $Fe_3O_4$ was changed in the usual range thereof.

EXAMPLE 2

A roller-form charging member No. 1 was prepared in the same manner as in Example 1 except for using a formulation comprising: 100 parts of an EPDM (trade name: EPT 4045, mfd. by Mitsui Sekiyu Kagaku), 10 parts of zinc white (Zinc White No. 1), 2 parts of stearic acid, 100 parts of $ZnO.Al_2O_3$, 2 parts of an accelerator "M" (trade name: Nocceler M, mfd. by Ouchi-Shinko Kagaku), 1 part of an accelerator "BZ" (trade name: Nocceler BZ, mfd. by Ouchi-Shinko Kagaku), 2 parts of sulfur, 5 parts of a foaming agent (trade name: Cellmic C, mfd. by Sankyo Kasei), 5 parts of a foaming aid (trade name: Cellton NP, mfd. by Sankyo Kasei); and 45 parts of HAF carbon as a reinforcing agent, and 60 parts of paraffin oil as an insulating oil.

Separately, a roller-form charging member No. 2 was prepared in the same manner as in the case of the charging charging member No. 1 described above except that 50 parts of the HAF carbon and 65 parts of the paraffin oil were used.

Further, a roller-form charging charging member No. 3 was prepared in the same manner as in the case of the charging charging member No. 1 described above except that 45 parts of the HAF carbon and 55 parts of the paraffin oil were used.

Separately, a composition comprising 150 parts of $ZnO.Al_2O_3$, 100 parts of a silicone rubber (trade name: KE 520, mfd. by Shinetsu Kagaku), 2 parts of a silicone crosslinking agent (trade name: C8 mfd. by Shinetsu Kagaku), and 1.5 parts of AIBN was subjected to primary vulcanization (250° C., 20 min), and further subjected to secondary vulcanization (200° C., 4 hours). Then the resultant composition was formed into a roller-form charging charging member No. 4.

Separately, a roller-form charging member No. 5 was prepared in the same manner as in the case of the charging charging member No. 3 described above except that 70 parts of $In_2O_3.SnO_2$ were used.

Further, a roller-form charging charging member No. 6 was prepared in the same manner as in the case of the charging member A described herein above except that 20 parts of HAF carbon, 70 parts of paraffin oil and 20 parts of Ketjen Black EC were used.

Further, a roller-form charging charging member No. 7 was prepared in the same manner as in the case of the charging member E described herein above except that 100 parts of $Fe_3O_4$ were used.

Hardnesses and electric resistances of the thus prepared charging member Nos. 1–7 are shown in Table 2 appearing hereinafter.

Each of the charging member Nos. 1–7 was assembled in an electrophotographic apparatus (laser-beam printer) as shown in FIG. 2 as a charging member for transfer operation, and subjected to image formation evaluation.

The image formation was conducted under the following conditions:

Photosensitive member: OPC drum (diameter=40 mm)

Dark part potential ($V_D$): −600 V

Light part potential ($V_L$): −100 V

Toner: one-component insulating magnetic toner

Development: Reversal development

Transfer material: copy paper (weight: 64 g/$m^2$)

Paper feed speed: 40 mm/sec.

The OPC photosensitive member 4 used herein was one prepared in the following manner.

There was provided a substrate of an aluminum cylinder having a wall thickness of 0.5 mm, a diameter of 40 mm and a length of 260 mm. A coating liquid obtained by dissolving 4 parts of a copolymer nylon (trade name: CM-8000, mfd. by Toray K. K.) and 4 wt. parts of a nylon-8 (trade name: Luckamide 5003, mfd. by Dainihon Ink K. K.) in 50 parts of methanol and 50 parts of n-butanol was applied onto the substrate by dip coating to form a 0.6 micron-thick polyamide undercoat (or primer) layer.

Next, 10 parts of a disazo pigment represented by the following structural formula as a charge-generation substance, and 10 parts of a polyvinyl butyral resin (S-LEC BM2, mfd. by Sekisui Kagaku K. K.) as a binder resin were dispersed in 120 parts of cyclohexanone by means of a sand mill for 10 hours.

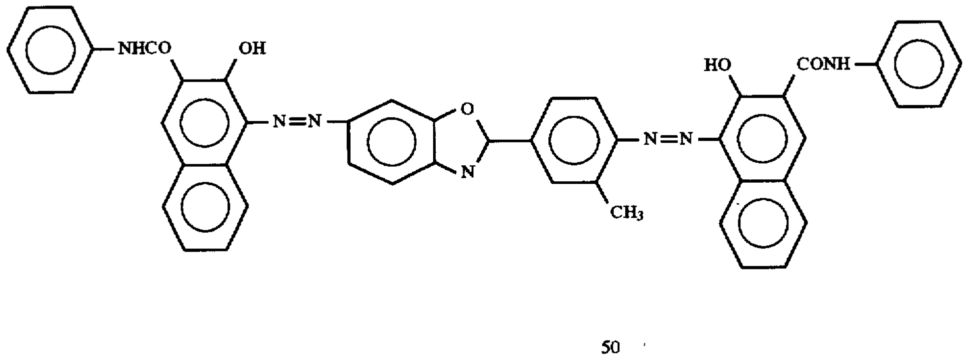

To the resultant dispersion, 30 parts of methyl ethyl ketone was added, and then the dispersion was applied onto the undercoat layer to form a 0.15 micron-thick charge generation layer.

Then, 10 parts of a hydrazone compound represented by the following structural formula as a charge-transporting substance, and 10 parts of a polycarbonate-Z resin (weight-average molecular weight of 12×$10^4$ mfd. by Mitsubishi Gas Kagaku K. K.) as a binder resin were dissolved in 80 parts of monochlorobenzene.

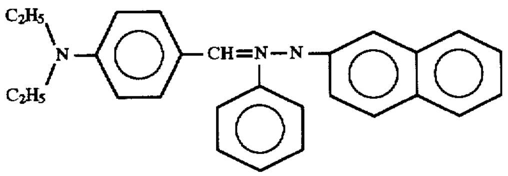

The resultant coating liquid was applied onto the above-mentioned charge generation layer to form a 18 micron-thick charge transport layer, whereby an OPC drum) was prepared.

The charging roller 5 used herein comprised a metal core and an electroconductive rubber layer disposed thereon, which comprised an electroconductive polyurethane rubber having a resistance of $10^6$ ohm. The resistance used herein was a resistance of from the metal core to the roller surface, with respect to a roller surface area of 1 $cm^2$.

The charging roller 5 was constantly caused to contact the OPC drum 4 under a predetermined pressure (e.g., a line pressure of 0.01–0.2 kg/cm), and uniformly charged the photosensitive member when supplied with a predetermined voltage. While a charging roller was used as a charging means in this instance, a conventional corona charger could also be used.

TABLE 2

| Charging member | 1 | 2 | 3 | 4 | 5 | 6 | 7 |
|---|---|---|---|---|---|---|---|
| Hardness*1 | 28 | 30 | 32 | 30 | 28 | 30 | 28 |
| Electric resistance (ohm) | 2 × $10^8$ | 2 × $10^9$ | 5 × $10^8$ | 1 × $10^9$ | 6 × $10^8$ | 1 × $10^5$ | 3 × $10^{12}$ |
| Evaluation of image | ⊙ | ⊙ | ⊙ | ○ | ○ | x*2 | x*3 |

⊙: Excellent image quality as in the initial stage was provided even after copying of 100,000 sheets.
○: Good image quality
x: Poor image
*1The hardness was measured by means of a measurement device (trade name: Asker C, mfd. by Kobunshi Keiki K. K.).
*2Leak occurred.
*3Transfer failure occurred.

EXAMPLE 3

A formulation comprising: 100 parts of CR rubber (trade name; WM-1, mfd. by Showa Neoprene K. K.), 4 parts of MgO (trade name: Kyowa Mag 150), 9 parts of Ketjen Black EC, 30 parts of Circo Light R.P.O. (mfd. by Nihon San Sekiyu), 20 parts of a rubber softener (trade name: Neofactice-N, mfd. by Tenma Sabu Kako), 2 parts of paraffin wax (mfd. by Mobil Oil), 2 parts of a dehydrating agent (trade name: CML #21 mfd. by Omi Kagaku), 5 parts of ZnO (No. 1), 1.6 parts of an accelerator (trade name: 22S, mfd. by Kawaguchi Kogyo), 2 parts of an accelerator BUR, 8 parts of Cellmic C (Sankyo Kasei), and 4 parts of Cellton NP (Sankyo Kasei) was uniformly dispersed and kneaded by means of a twin-roller device.

The resultant rubbery kneaded product was wound about a metal core of iron having a diameter of 6 mm and a length of 250 mm, onto which a primer had been applied, charged into a mold, and preformed at 40° C. and 100 kgf/cm$^2$. The resultant product was vulcanized by steam vulcanization (150° C., 30 min) and then subjected to abrasion machining, whereby an undercoat elastomeric layer was formed on the metal core. The resultant product had an outside diameter of 11 mm and the rubber layer thereof had a length of 240 mm.

Separately, a formulation comprising: 100 parts of an EPDM rubber (trade name: EPT 4045, mfd. by Mitsui Sekiyu Kagaku), 100 parts of zinc white (Zinc White No. 1), 2 parts of stearic acid, 2 parts of an accelerator "M", 1 part of an accelerator "BZ", 2 parts of sulfur, 60 parts of a paraffin oil, 45 parts of HAF carbon and 100 parts of $ZnO.Al_2O_3$ was uniformly dispersed and kneaded by means of a twin-roller device.

The resultant rubbery kneaded product was wound about the above-mentioned CR sponge roller by means of a crosshead extruder and preformed. The resultant product was again vulcanized by steam vulcanization (160° C., 30 min) and then subjected to abrasion machining, whereby a roller-form charging member was prepared. The resultant charging member had an outside diameter of 12 mm and the rubber layer thereof had a length of 230 mm.

Figure 5:
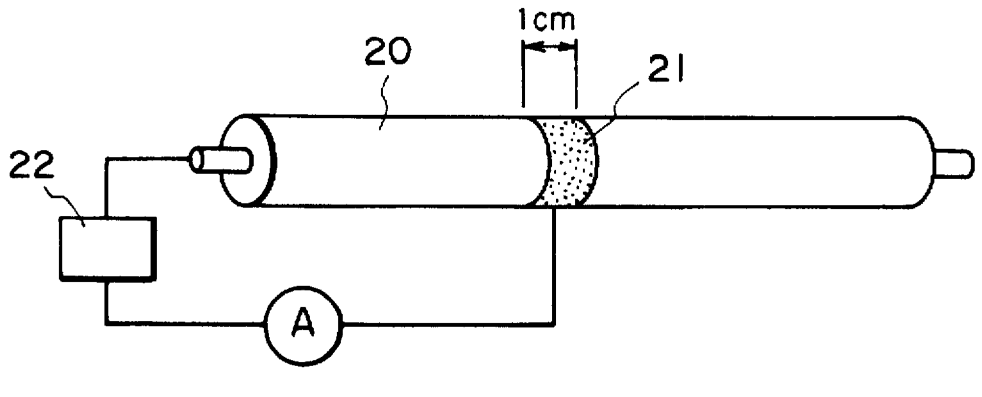
FIG. 5 is a schematic perspective view for illustrating a method of measuring the resistivity of a roller-form charging member.

The resistance of the thus prepared roller was measured according to a method as shown in FIG. 5.

More specifically, an aluminum foil 21 having a width of 10 mm was wound about the base layer 20 of the charging member, and a DC voltage of 1 KV was applied between the metal core and the aluminum foil 2) by means of a power supply 22. The resistance between the metal core and the aluminum foil 21 was measured by measuring the current passing therethrough. As a result, the resistance was $4\times10^7$ ohm.cm under a condition of 25° C. and 60% RH.

The above-mentioned roller was assembled as a charging roller 5 in an electrophotographic apparatus as shown in FIG. 2, and the roller No. 1 obtained in Example 2 was used as the transfer roller 1.

By using such an apparatus, image formation evaluation was conducted in the same manner as in Example 2 except that an AC voltage having a frequency of 150 Hz and an AC peak-to-peak voltage of 2 KV, and a DC voltage of 700 V were applied to the charging roller 5. As a result, a high image quality which was the same as that in the initial stage was obtained even after successive copying of 100,000 sheets.

Further, a pin-hole having a diameter of 0.5 mm was formed on the OPC drum (photosensitive member), and image formation evaluation was conducted in the same manner as described above under respective conditions of 15° C.—10% RH, 25° C.—60% RH, and 32.5° C.—85% RH. Under each of the three species of conditions, the surface layer or undercoat elastomeric layer of the charging member did not cause conducting breakdown, and the charging member provided a charging potential sufficient for charging.

What is claimed is:

1. A charging member comprising an elastomeric member comprising an elastomeric material, the elastomeric material comprising a polymer dispersion medium having a double oxide dispersed therein, said double oxide being a solid solution compound of oxides of at least two different metals formed by crystal lattice substitution, wherein said at least two different metals have different valences, whereby said double oxide has an electroconductivity that is larger than that of either one of said oxides of at least two different metals when not in solution, said charging member having resistance stability in the semiconductive region.

2. A charging member according to claim 1, which comprises an electroconductive substrate and the elastomeric member disposed thereon.

3. A charging member according to claim 1, wherein the double oxide comprises at least one species selected from the group consisting of: solid solution compounds comprising zinc oxide and aluminum oxide; solid solution compounds comprising tin oxide and antimony oxide; and solid solution compounds comprising indium oxide and tin oxide.

4. A charging member according to claim 1, wherein the elastomeric member contains 5–40 wt. % of the double oxide based on the weight of the elastomeric member.

5. A charging member according to claim 1, wherein the elastomeric member further contains a reinforcing agent.

6. A charging member according to claim 5, wherein the reinforcing agent comprises carbon black.

7. A charging member according to claim 1, wherein the elastomeric member further contains an insulating oil.

8. A charging member according to claim 1, wherein the elastomeric member contains the double oxide, 0.1–20 wt. % of carbon black and 5–20 wt. % of an insulating oil, based on the weight of the elastomeric member.

9. A charging member according to claim 8, wherein the double oxide comprises a solid solution compound comprising zinc oxide and aluminum oxide.

10. A charging member according to claim 1, wherein said double oxide comprises a solid solution compound including tin oxide and antimony oxide.

11. A charging member according to claim 1, wherein said double oxide comprises a solid solution compound including indium oxide and tin oxide.

12. A charging member according to claim 1, wherein said double oxide comprises a solid solution compound including zinc oxide and aluminum oxide.

13. A charging member according to claim 1, wherein said double oxide comprises a solid solution compound including zinc oxide and titanium oxide.

14. A charging member according to claim 1, wherein said double oxide comprises a solid solution compound including magnesium oxide and aluminum oxide.

15. A charging member according to claim 1, wherein said double oxide comprises a solid solution compound including iron oxide and titanium oxide.

16. A charging member according to claim 1, wherein said double oxide has a specific resistance of $10^1$ to $10^3$ ohm.cm.

17. An electrophotographic apparatus comprising an electrophotographic photosensitive member and a charging member disposed in contact with a surface of said photosensitive member, wherein said charging member comprises an elastomeric member comprising an elastomeric material, the elastomeric material comprising a polymer dispersion medium having a double oxide dispersed therein, said double oxide being a solid solution compound of oxides of at least two different metals formed by crystal lattice substitution, wherein said at least two different metals have different valences, whereby said double oxide has an electroconductivity that is larger than that of either one of said oxides of at least two different metals when not in solution, said charging member having resistance stability in the semiconductive region.

18. An apparatus according to claim 17, wherein the charging member is disposed in a position such that a toner image to be formed on the photosensitive member surface is transferred to a transfer material by means of the charging member.

19. An apparatus according to claim 17, wherein the charging member is disposed in a position such that the photosensitive member is uniformly charged by means of the charging member.

20. An apparatus according to claim 17, wherein the double oxide comprises at least one species selected from the group consisting of: solid solution compounds comprising zinc oxide and aluminum oxide; solid solution compounds comprising tin oxide and antimony oxide; and solid solution compounds comprising indium oxide and tin oxide.

21. An apparatus according to claim 20, wherein the elastomeric member contains the double oxide, 0.1–20 wt. % of carbon black and 5–20 wt. % of an insulating oil, based on the weight of the elastomeric member.

22. An apparatus according to claim 21, wherein the double oxide comprises a solid solution compound comprising zinc oxide and aluminum oxide.

23. A facsimile apparatus comprising an electrophotographic apparatus and receiving means for receiving image information from a remote terminal, said electrophotographic apparatus comprising an electrophotographic photosensitive member and a charging member disposed in contact with a surface of said photosensitive member, wherein said charging member comprises an elastomeric member comprising an elastomeric material, the elastomeric material comprising a polymer dispersion medium having a double oxide dispersed therein, said double oxide being a solid solution compound of oxides of at least two different metals formed by crystal lattice substitution, wherein said at least two different metals have different valences, whereby said double oxide has an electroconductivity that is larger than that of either one of said oxides of at least two different metals when not in solution, said charging member having resistance stability in the semiconductive region.

24. A facsimile apparatus according to claim 23, wherein the double oxide comprises at least one species selected from the group consisting of: solid solution compounds comprising zinc oxide and aluminum oxide; solid solution compounds comprising tin oxide and antimony oxide; and solid solution compounds comprising indium oxide and tin oxide.

25. A method of preparing a charging member, said method comprising the steps of:

(a) dispersing a double oxide in a polymer dispersion medium, the double oxide being a solid solution compound formed by crystal lattice substitution of oxides of at least two different metals, the product of said dispersing step being an elastomeric composition;

(b) applying the elastomeric composition formed in said dispersing step to a metal core; and (c) heating the product of said applying step to form the charging member.

* * * * *

UNITED STATES PATENT AND TRADEMARK OFFICE

CERTIFICATE OF CORRECTION

PATENT NO. : 5,757,508

DATED : May 26, 1998

INVENTOR : JUN MURATA

It is certified that error appears in the above-identified patent and that said Letters Patent is hereby corrected as shown below:

COLUMN 2:

line 5, "displaced" should read --dispersed--;
line 21, "member;" should read --member.--; and
line 32, "such" should be deleted.

COLUMN 4:

line 18, "addition" should be deleted;
line 24, "of below" should read --below--;
line 40, "$ZnO.Al_2O_3$" should read --$ZnO \cdot Al_2O_3$--; and
line 49, "obtained" should read --be obtained--.

COLUMN 5:

line 44, "marked to" should read --marked--.

COLUMN 8:

line 42, "facsimile" should read --a facsimile machine--.

UNITED STATES PATENT AND TRADEMARK OFFICE

CERTIFICATE OF CORRECTION

PATENT NO. : 5,757,508

DATED : May 26, 1998

INVENTOR : JUN MURATA

It is certified that error appears in the above-identified patent and that said Letters Patent is hereby corrected as shown below:

<u>COLUMN 10</u>:

line 40, "charging charging" should read --charging--;
line 53, "charging" should be deleted;
line 56, "charging" should be deleted;
line 58, "charging charging" should read --charging--;
and
line 63, "charging charging" should read --charging--.

<u>COLUMN 12</u>:

line 16, "drum)" should read --drum--.

<u>COLUMN 13</u>:

line 46, "foil 2)" should read --foil 2--.

UNITED STATES PATENT AND TRADEMARK OFFICE
CERTIFICATE OF CORRECTION

PATENT NO. : 5,757,508

DATED : May 26, 1998

INVENTOR : JUN MURATA

It is certified that error appears in the above-identified patent and that said Letters Patent is hereby corrected as shown below:

COLUMN 14:

line 64, "ohm.cm." should read --ohm·cm.---.

Signed and Sealed this

Twenty-third Day of March, 1999

Attest:

Q. TODD DICKINSON

Attesting Officer

*Acting Commissioner of Patents and Trademarks*